Nov. 23, 1954　　A. A. LINSCHEID　　2,694,894
HARVESTER PICKUP REEL
Filed June 25, 1952　　6 Sheets-Sheet 1
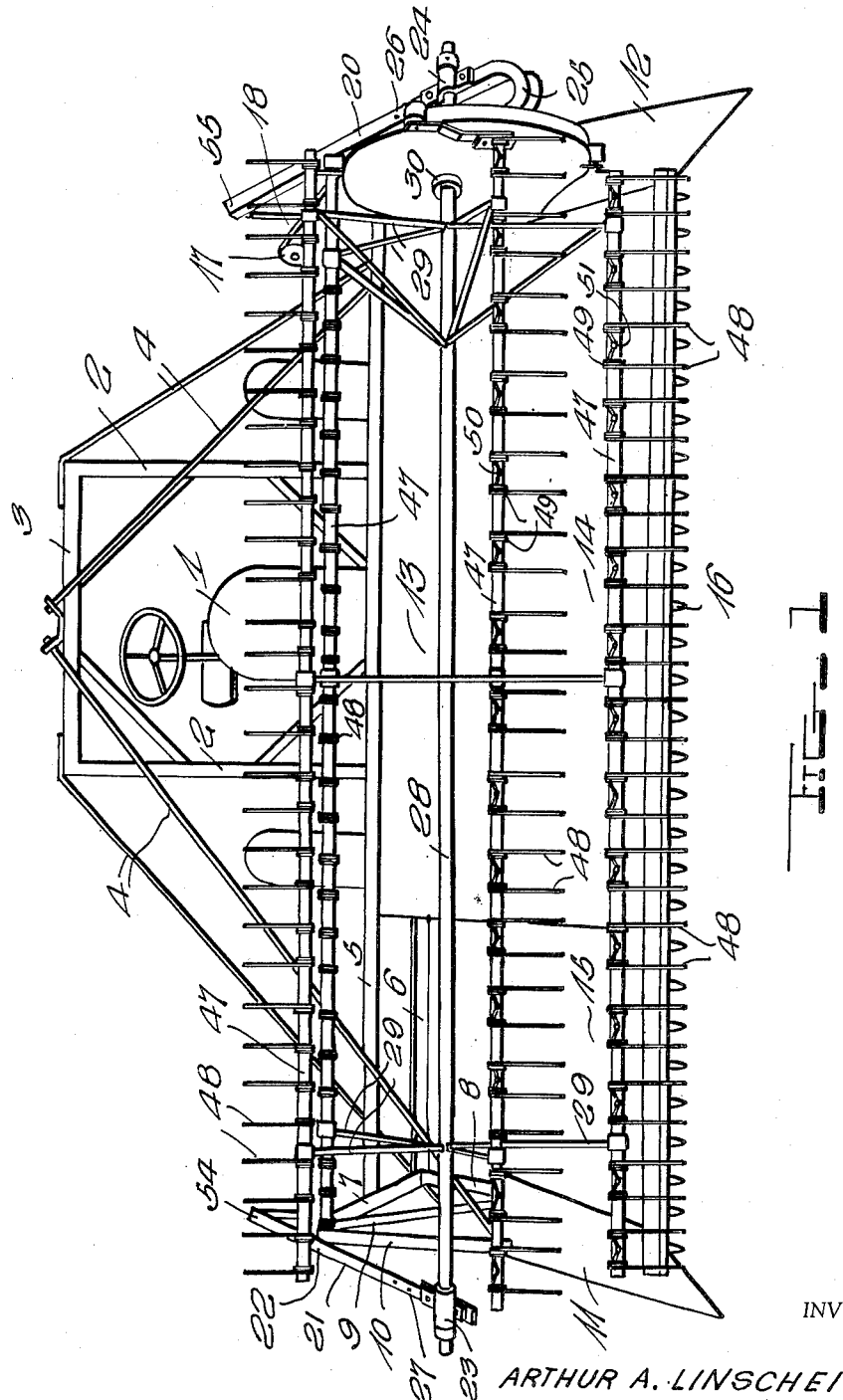
INVENTOR
ARTHUR A. LINSCHEID,
BY Linton and Linton
ATTORNEYS

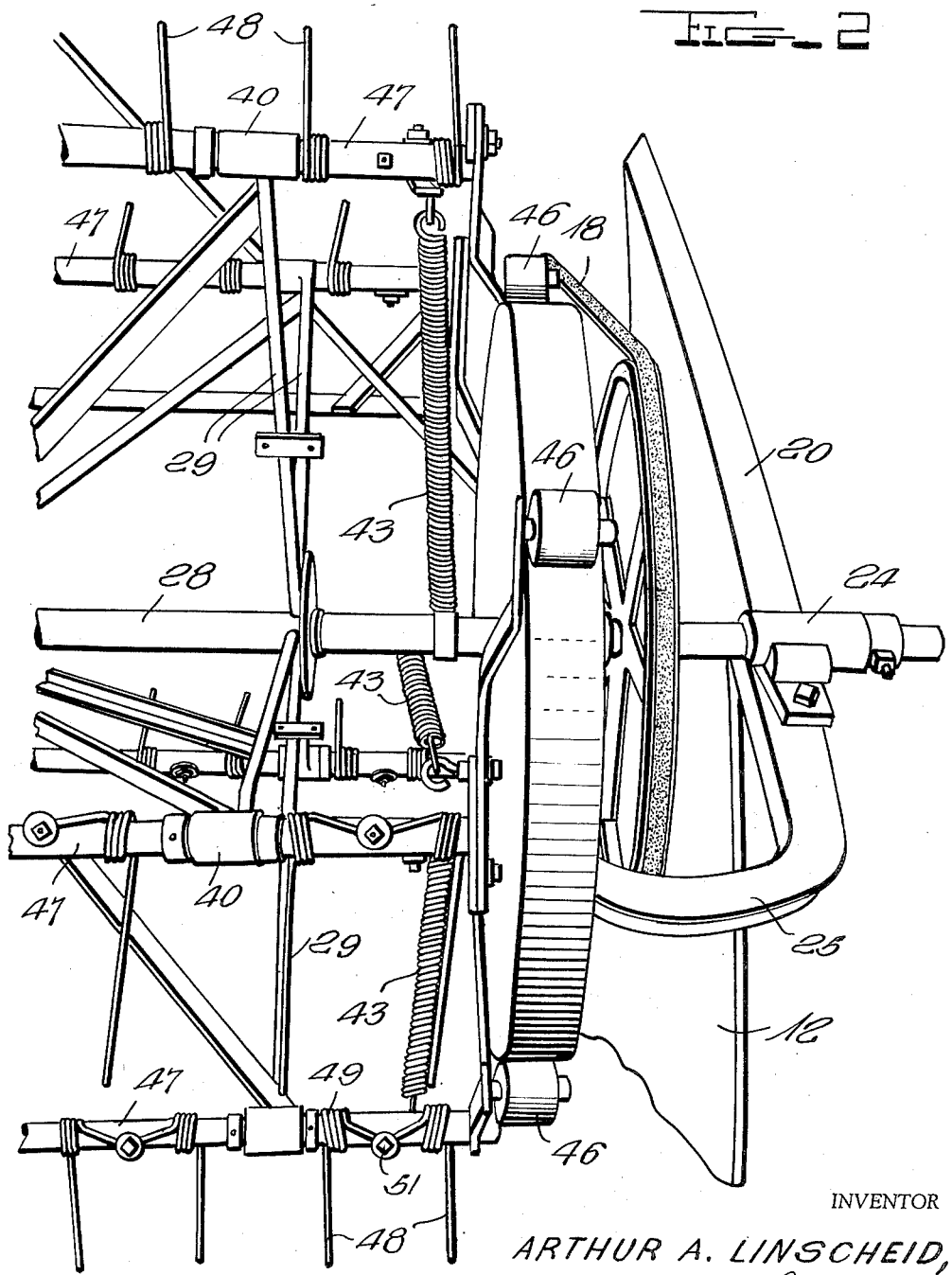

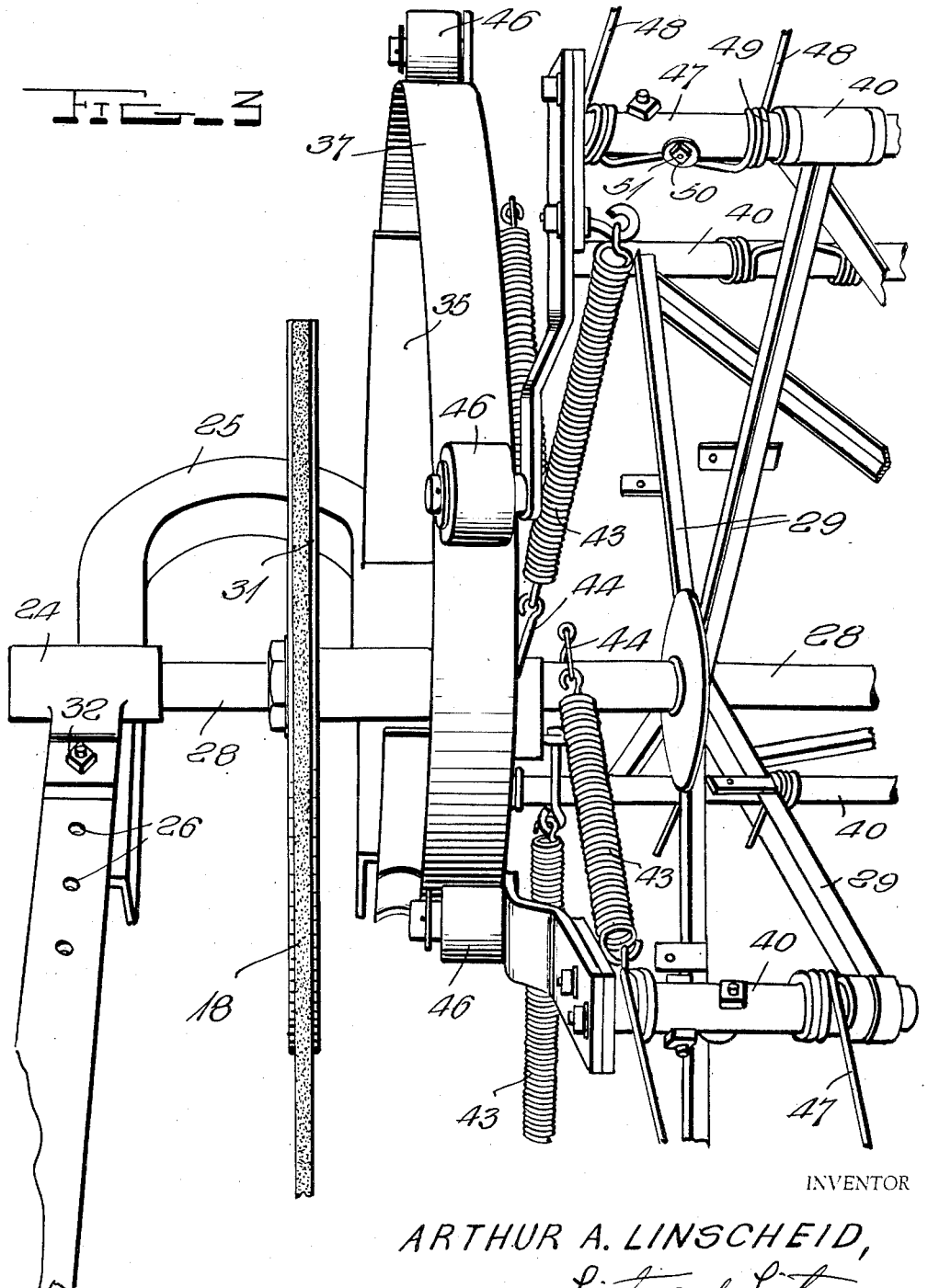

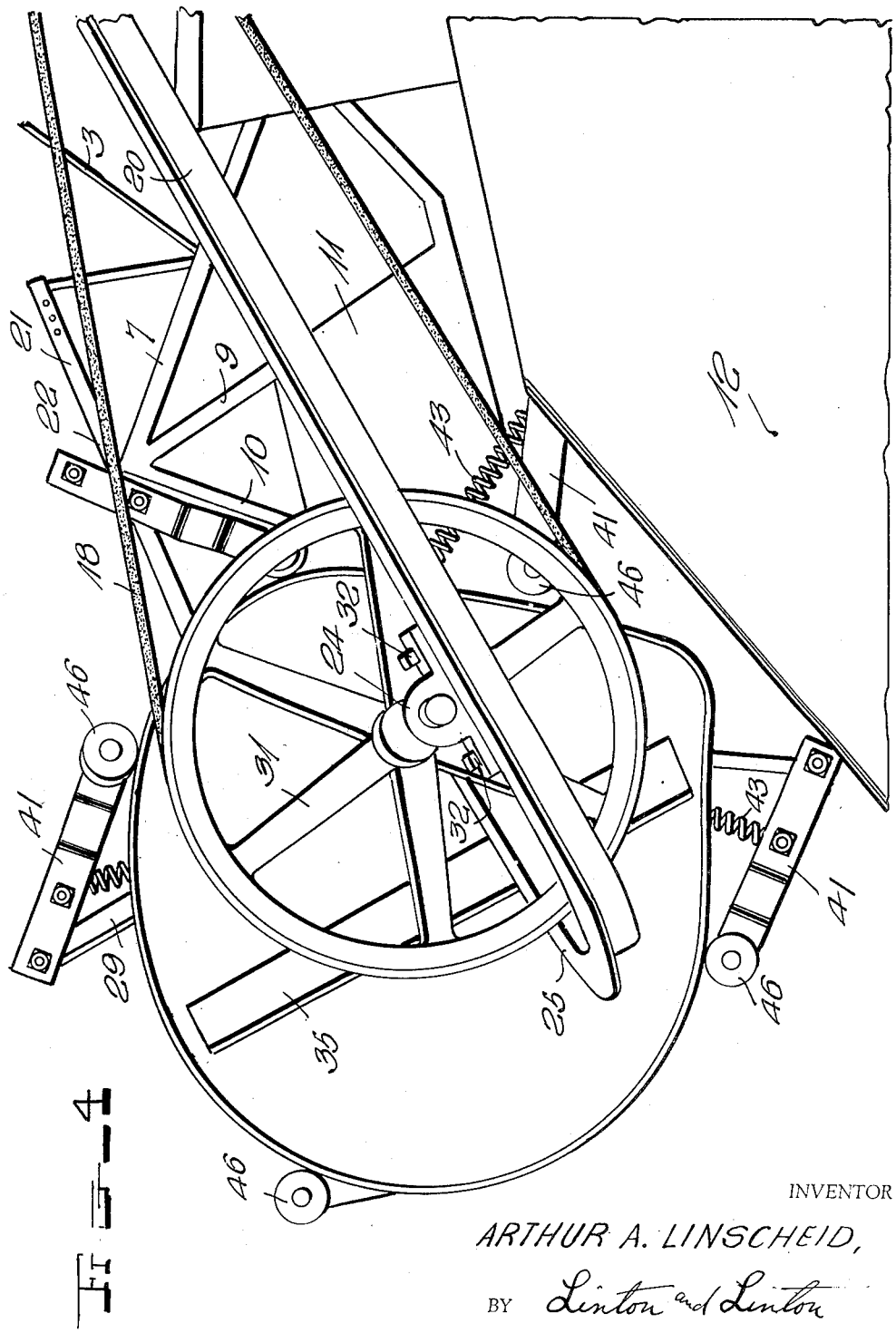

Nov. 23, 1954 — A. A. LINSCHEID — 2,694,894
HARVESTER PICKUP REEL
Filed June 25, 1952 — 6 Sheets-Sheet 5
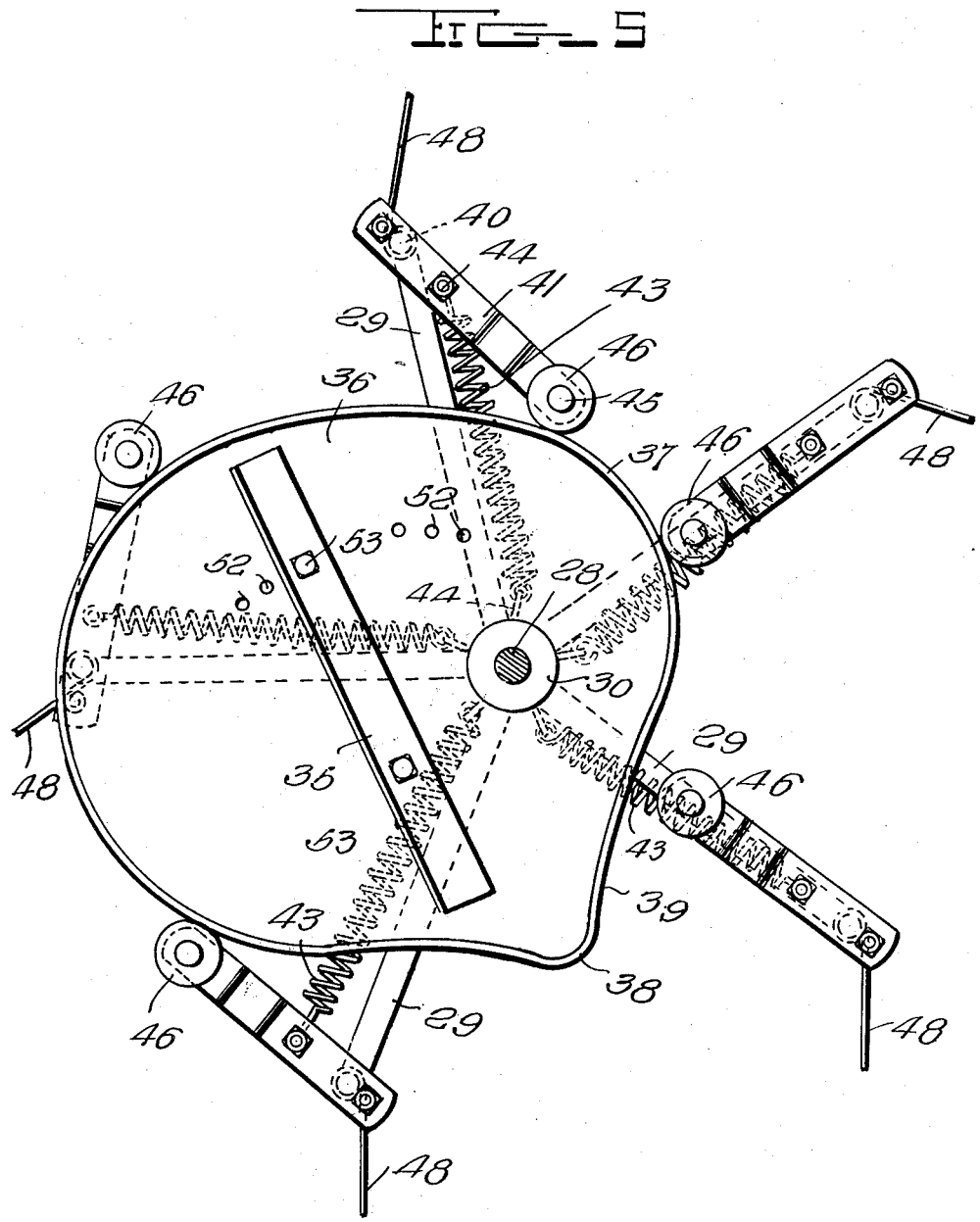
INVENTOR
ARTHUR A. LINSCHEID,
BY Linton and Linton
ATTORNEYS Nov. 23, 1954     A. A. LINSCHEID     2,694,894
HARVESTER PICKUP REEL
Filed June 25, 1952                      6 Sheets-Sheet 6
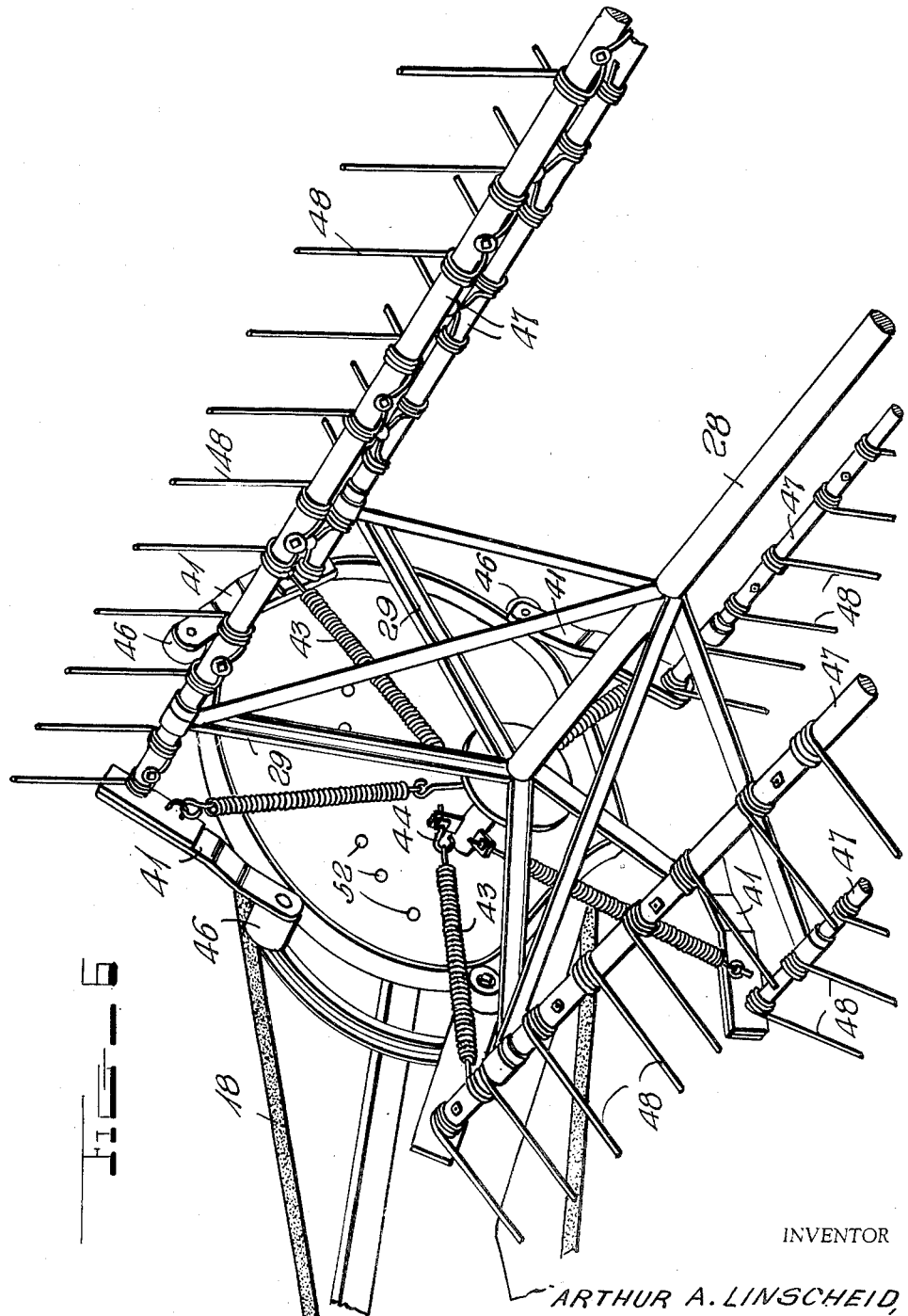
INVENTOR
ARTHUR A. LINSCHEID,
BY Linton and Linton
ATTORNEYS

United States Patent Office 2,694,894
Patented Nov. 23, 1954

2,694,894

HARVESTER PICKUP REEL

Arthur A. Linscheid, American Falls, Idaho

Application June 25, 1952, Serial No. 295,505

1 Claim. (Cl. 56—226)

The present invention is concerned with pick-up reels for use with agricultural machinery, in particular, harvesters for field crops employing cutter bars with which the pick-up reel cooperates in harvesting severed, fallen, or normally standing crops.

The principal object of the invention is to provide a pick-up reel that can be readily mounted for association with the cutter bar of various types of harvesters of the reaper or mower type for picking up fallen crops immediately in front of the cutter bar and raking the crop backward over and behind said cutter bar with a minimum thrashing thereof during the moment said crop is being severed.

A further and important object of the invention is to provide a harvester pick-up reel having movable rake teeth whose position is automatically controlled for causing the teeth to assume an angle of approach to fallen crops which will lift the same over the associated harvester cutter bar during rotation of the reel and will then assume an angle of withdrawal whereby said crop is caused to fall gently behind the cutter bar.

A still further object of the invention is to provide a harvester pick-up reel having movable rake teeth whose movemnt is controlled by means of a cam which is adjustable for varying the timing and positioning of the teeth as required.

Another important object of the invention is to provide a non-fouling pick-up reel of a simple and economical construction which can be readily mounted on harvesters of the reaper and mower type and which reel can be mounted for a quick adjustment in its position relative to the ground.

Further objects of the invention will be in part evident and in part pointed out in the following detailed description of the drawings in which:

Fig. 1 is a front elevation of a tractor mounted harvester having the present pick-up reel operatively mounted thereon;

Fig. 2 is a front enlarged fragmentary view of the right hand portion of the cutting reel and its control elements;

Fig. 3 is a rear enlarged fragmentary view taken from the opposite side of Fig. 2;

Fig. 4 is an enlarged side elevation of the reel controlling cam, drive elements and supports;

Fig. 5 is an enlarged detail view of the control cam and cooperating elements for the pick-up reel;

Fig. 6 is an enlarged perspective view of the right hand portion of the cutting reel, control elements and drive as viewed from the rear of the reel.

Referring now more in detail to the accompanying drawings wherein like and corresponding parts are designated by similar reference characters, there is shown one type of a harvester to which the present cutting reel can be applied. This harvester is mounted upon the front of a conventional farm tractor 1 and has a rectangular frame consisting of side supports 2 which are pivotally mounted on the front of the tractor with horizontal cross pieces 3 from which extend braces 4. This harvester also has lateral bars 5 and 6 mounted on the uprights 2 and from the ends of which extend supporting bars 7 and 8. These bars 7 and 8 of which there is a similar bar at each end of the harvester, also has mounted thereon a pair of vertical supports 9 and 10 which meet at the top and are spaced apart at the bottom. Extending vertically and forwardly the harvester are a pair of guide plates 11 and 12 mounted upon the uprights 9 and 10 for the purpose of guiding crops to the cutters. A vertical apron 13 and horizontal apron 14 extend from the right hand side of the harvester or guide plates 12 partially towards the left hand side leaving a windrow opening 15 through which the harvested crop falls to the ground. Along the forward edge of apron 14 there is mounted a cutter bar 16 which is armed with slotted fingers or guards through the slots of which triangular laterally moving cutters reciprocate for mowing the crops presented thereto.

All the foregoing elements are conventional structures and are merely referred to herein as an example of a harvester in order to show the operation of the present cutting reel in connection therewith. As shown in this application, the cutter bar 16 is driven from a power take-off mechanism and in the present instance, pulley 17 represents an element of this cutter bar drive which is rotated therewith for driving an endless belt 18.

Pivotally mounted at a medial portion thereof upon the apex of uprights 9 and 10 are controlling supports 20 and 21 pivotally supported at 22. These supports have bearings 23 and 24 mounted upon their forward end with support 20 having a U-shaped end portion 25. These supports also have a series of openings 26 and 27 extending longitudinally thereof whereby the bearings 23 and 24 can be adjustably mounted by changing the position of their nuts and bolts 32 which extend through the openings 26 and 27.

A supporting rod 28 extends laterally of the harvester and is rotatably mounted at each end in the bearings 23 and 24. A plurality of spokes 29 extend radially from each end portion of said rod 28 and said rod also extends through a bearing 30 in the fixed control cam for the reel and has a drive pulley 31 fixedly mounted on an end portion therof to be rotated by the endless belt 18.

As best shown in Fig. 5, the cutting reel is controlled by a cam consisting of a support 35 fixedly mounted on the end of the U-shaped portion 25 of support 20. This cam which consists of a vertical plate 36 having a track-way 37 extending laterally and around the periphery thereof is given a special shape for operating the raking members, as hereinafter described. For the most part, track-way 37 is substantially arcuate in formation except for the peak 38 and the indentation 39 thereafter. Bearing 30 for rod 28 extends through the rear medial portion of plate 36 with the principal portion of the plate 36 extending forwardly thereof.

Each of the radial spokes 29 has a bearing 40 carried at the end thereof upon which is pivotally mounted a control arm 41 which is pivotally supported at one end portion thereby. Attached to the medial portion of each arm 41 is a coil spring 43 attached at one end to rod 28 and at its opposite end to bolt 44 and thereby tends to pull the free end of arm 41 in line with spoke 29. The free end of arm 41 has a stub axle 45 extending laterally thereof and upon which is rotatably mounted a roller 46 which runs upon track-way 37 and roller 46 is formed of self-lubricating material which will minimize friction therebetween.

Rotatably mounted upon the ends of each spoke 29 and extending parallel with rod 28 is a plurality of tubes 47 which rotatably extend through bearings 40. Each tube 47 has a plurality of wires wrapped therearound with the two end portions 48 extending outwardly from the tube forming racking teeth 48. Intermediate portions of these wires are wrapped around tube 47 several times as at 49 and their medial portion held against the tube 47 by means of a washer 50 held tight by a bolt 51.

Cam plate 36 also has an arcuate series of openings 52 formed therethrough whereby the plate can be moved relative to support 35 for changing the point of approach and release of the teeth 48 by inserting bolt 53 in any of the openings 52 for changing the position of the cam.

The rear ends of supports 20 and 21 are connected to vertical control rods 54 and 55 of the hydraulic system of a tractor or by mechanical means or by a hand operated lever or crank whereby the operator of a tractor can pivot supports 20 and 21 for raising and lowering the pick-up reel as desired.

In the operation of the present device the tractor conveys the harvester down the field and through means of its power take off, operates the cutter bar 16 and also drives the endless belt 18. Thus as the harvester proceeds with its mowing, rake teeth 48 of each tube 47 are brought in succession towards the ground in front of the cutter bar 16, for picking up fallen, severed or normally standing crops and move the same over and behind said cutter bar with a minimum thrashing effect upon the crops and allowing unsevered crops to be readily cut by said cutter bar. The gathered crop falls upon the apron 14 and slides through the opening 15 in a uniform and even windrow.

The position of the teeth 48 of each tube 47 is controlled at all times as the rod 28 rotates carrying spokes 29 and tubes 47 therewith, rollers 46 move along trackway 37 and are held therewith by spring 43. Thus due to the configuration of track-way 37 teeth 48 controlled by the roller 46 at the bottom of the cam are given a substantially vertical position which gradually assumes this vertical direction as the tooth moves from the forward to the bottom portion of the cam for picking up fallen or standing crops. When the roller 46 reaches peak 38 of the cam said roller suddenly disengages from the track-way due to the convex configuration of section 39 of said track-way leaving the tooth 47 free except for the action of the spring 43. Thus the teeth 48 are independent of the cam at that moment and thereby gently conveys the crop beyond the cutter bar without thrashing the crop. As the spoke 29 continues further up the rearward portion of the track-way 37, the teeth 48 are moved from a vertical to a substantially horizontal position for disengaging the crop upon the apron 14.

Inasmuch as the bearings 40 do not rotate, there is no tendency for grains or the like to wrap therearound. Fouling by wrapping over of crops is further retarded by the oscillating action of the rake or pick-up teeth at the interval of discharge.

Conventional wooden reel bats can be attached to the tubes 47 or attached to the pick-up fingers 48. When using these conventional wooden bats an advantage over other pick-up reels is experienced as the bats on the present reel can be continuous for the length of the reel, other reels must use bats with sectional members leaving a gap at the bearing point 40 to permit rotation of the bat around its axis. The present bats osculate and do not rotate.

The present pick-up reel is capable of use with all harvesters of the reaper or mower type and is capable of considerable modification, but such changes thereto as come within the scope of the appended claim are deemed to be a part of the present invention.

I claim:

In a harvester having a cutter bar, a pick-up reel comprising a driving rod rotatably supported by said harvester substantially parallel to and above said cutter bar and operatively connected to said harvester for being rotated thereby, a plurality of spokes radially and fixedly extending from each end portion of said rod, a plurality of rods each rotatably mounted on and extending between a pair of said spokes each at an opposite end of said rod, a plurality of raking teeth fixedly positioned in a series along and extending laterally from each of said rods, a plurality of arms each fixedly connected at one end to and extending laterally from an end of one of said rods obliquely to said raking teeth, a plurality of rollers each rotatably mounted on the opposite end of one of said arms, a plurality of coil springs connected at one end to and extending radially of said driving rod and each connected at its opposite end to a medial portion of one of said arms tending to draw the roller end of said arms towards said driving rod to a position in line with its connected spoke, an endless trackway fixedly supported by said harvester laterally of said driving rod and having said rollers in rolling contact therewith for the major portion thereof and said trackway having a configuration for raising said rollers and said arms against the action of said springs and thereby oscillating said raking teeth during their pick-up and discharge of the crops, but being out of contact with said roller during the discharge by said teeth of the crops whereby said coil springs abruptly pivots said arms for forcibly discharging the crop from said teeth.

References Cited in the file of this patent

UNITED STATES PATENTS

| Number | Name | Date |
|--------|------|------|
| 954,903 | White | Apr. 12, 1910 |
| 1,358,481 | Traphagen | Nov. 9, 1920 |
| 1,770,077 | Kunz | July 8, 1930 |
| 1,794,646 | Schueler | Mar. 3, 1931 |